(12) United States Patent
Marks et al.

(10) Patent No.: US 11,780,941 B2
(45) Date of Patent: Oct. 10, 2023

(54) HIGHLY BRANCHED, LOW MOLECULAR WEIGHT POLYOLEFINS AND METHODS FOR THEIR PRODUCTION

(71) Applicant: Northwestern University, Evanston, IL (US)

(72) Inventors: Tobin Jay Marks, Evanston, IL (US); Yanshan Gao, Evanston, IL (US); Tracy L. Lohr, Houston, TX (US); Qian Wang, Evanston, IL (US); Yip-Wah Chung, Wilmette, IL (US); David B. Pickens, III, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 17/573,858

(22) Filed: Jan. 12, 2022

(65) Prior Publication Data
US 2022/0135713 A1 May 5, 2022

Related U.S. Application Data

(63) Continuation of application No. 16/963,731, filed as application No. PCT/US2019/016762 on Feb. 6, 2019, now Pat. No. 11,242,421.
(Continued)

(51) Int. Cl.
*C08F 210/02* (2006.01)
*C08F 4/52* (2006.01)
(Continued)

(52) U.S. Cl.
CPC .............. *C08F 110/02* (2013.01); *C08F 4/52* (2013.01); *C08F 4/76* (2013.01); *C08F 210/02* (2013.01); *C08F 210/14* (2013.01); *C08F 210/16* (2013.01); *C08F 2810/30* (2013.01); *C08L 23/0815* (2013.01)

(58) Field of Classification Search
None
See application file for complete search history.

(56) References Cited

U.S. PATENT DOCUMENTS 9,469,700 B2 * 10/2016 Kallio ....................... C08F 4/76

FOREIGN PATENT DOCUMENTS

WO WO-9200333 A2 * 1/1992

OTHER PUBLICATIONS

Li, L. et al., "Catalyst/Cocatalyst Nuclearity Effects in Single-Site Polymerization. Enhanced Polyethylene Branching and α-Olefin Comonomer Enchainment in Polymerizations Mediated by Binuclear Catalysts and Cocatalysts via a New Enchainment Pathway". J. Am. Chem. Soc. 2002, 124(43), 12725-12741. (Year: 2002).*

* cited by examiner

*Primary Examiner* — Richard A Huhn
(74) *Attorney, Agent, or Firm* — BELL & MANNING, LLC

(57) ABSTRACT

Low molecular weight, highly branched polyolefins are provided. Also provided are catalyst-mediated methods of making the low molecular weight, highly branched polyolefins and a catalyst system for carrying out the methods. The catalyst system is a homogeneous catalytic system that includes a single-site organozirconium complex and hydrocarbon-soluble perfluoroarylborate co-catalyst that is highly active for the oligomerization of olefin monomers in nonpolar media.

13 Claims, 8 Drawing Sheets

Related U.S. Application Data

(60) Provisional application No. 62/626,879, filed on Feb. 6, 2018.

(51) Int. Cl.
*C08F 4/76* (2006.01)
*C08F 110/02* (2006.01)
*C08F 210/14* (2006.01)
*C08F 210/16* (2006.01)
C08L 23/08 (2006.01)

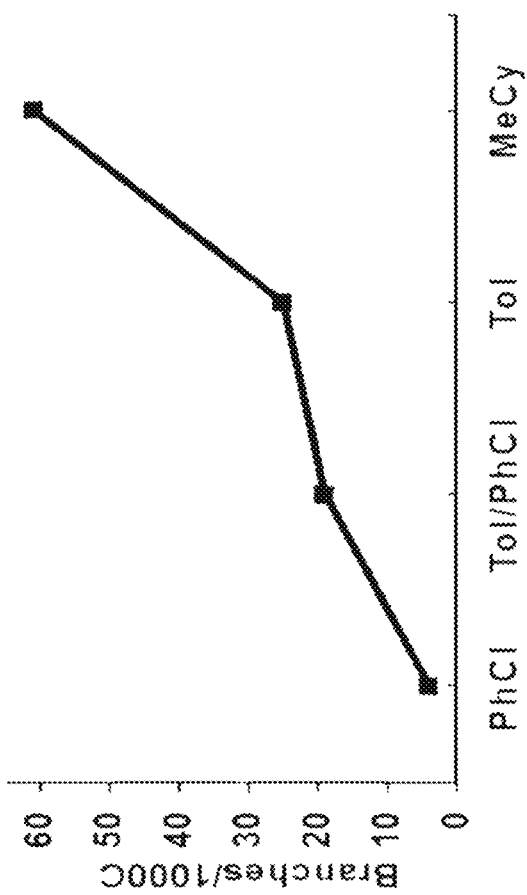 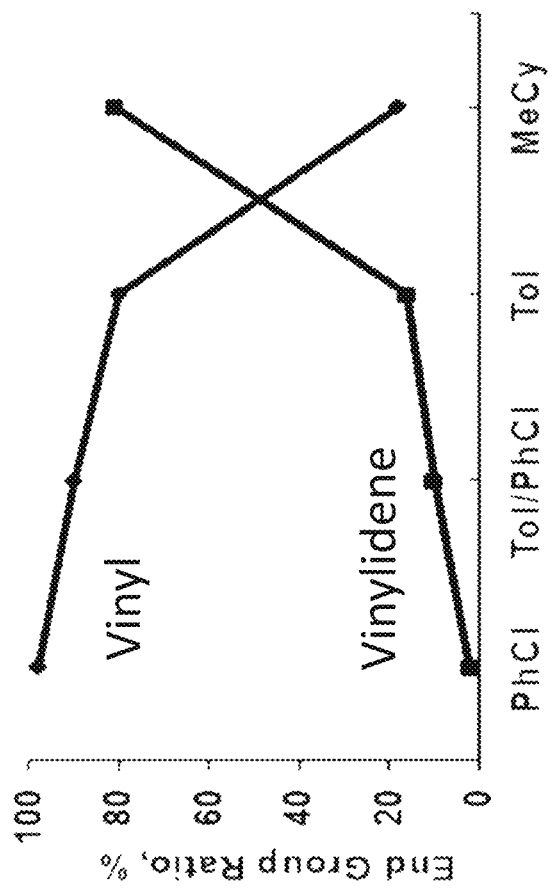
FIG. 3A
FIG. 3B

Table 1. Ethylene Polymerization Data

| Entry | monomer | solvent | T/°C | t/min | poly. (g) | act.[b] | $M_n$ (g/mol)[c] | branches /1000C[d] | ethyl/%[e] | n-butyl/%[e] | LCB/%[e] |
|---|---|---|---|---|---|---|---|---|---|---|---|
| 1 | E | PhCl | 25 | 30 | 16.96 | 3393 | 2080 | 36 | 20 | 14 | 66 |
| 2 | E | Tol | 25 | 30 | 3.96 | 790 | 408 | 22 | 45 | 16 | 39 |
| 3[f] | E | MeCy | 25 | 30 | 0 | 0 | - | - | - | - | - |
| 4 | E | MeCy | 25 | 30 | 12.57 | 2516 | 690 | 61 | 45 | 25 | 30 |
| 5 | E | MeCy | 25 | 20 | 9.24 | 2773 | 646 | 57 | 44 | 26 | 30 |
| 6 | E | MeCy | 25 | 10 | 4.74 | 2842 | 588 | 48 | 42 | 22 | 36 |
| 7 | E | MeCy | 40 | 30 | 10.29 | 2058 | 850 | 60 | 40 | 26 | 34 |
| 8 | E | MeCy | 60 | 30 | 7.75 | 1549 | 1140 | 51 | 33 | 23 | 43 |
| 9 | E | MeCy | 80 | 30 | 5.59 | 1118 | 1020 | 38 | 27 | 19 | 54 |
| 10 | E+H | Tol | 25 | 20 | 3.30 | 987 | 460 | 48 | 11 | 49 | 40 |
| 11 | E+H | MeCy | 25 | 4 | 3.09 | 4627 | 470 | 87 | 16 | 64 | 20 |
| 12 | E+H | MeCy | 25 | 8 | 5.52 | 4132 | 480 | 93 | 16 | 62 | 22 |
| 13 | E+H | MeCy | 25 | 20 | 11.54 | 3461 | 600 | 79 | 19 | 44 | 37 |

Conditions: catalyst, CGCZr, 10 µmol; cocatalyst, B$_{1,\text{n-octyl}}$, 10 µmol; ethylene, 1 atm; T, temperature of water bath surrounding the reactor; reaction solution for ethylene polymerization: PhCl, toluene or MeCy, 50 mL; solution for ethylene (E)/1-hexene (H) copolymerization: toluene or MeCy, 45 mL and 1-hexene, 5 mL; [b] Unit is kg·(mol of metal)$^{-1}$·h$^{-1}$·atm$^{-1}$. [c] $M_n$ calculated from $^1$H NMR intensity ratio of unsaturated end groups vs overall integral. [d] Branches/1000 C calculated from $^{13}$C $^1$H NMR intensity ratio of methyl groups vs overall integral. [e] Percentages of different branch lengths calculated from $^{13}$C NMR spectra. LCB = Long chain branch = n-hexyl and longer branches. [f] Ph$_3$C$^+$B(C$_6$F$_5$)$_4^-$ (B$_{1,\text{H}}$) used as cocatalyst. No activity likely due to insolubility of cocatalyst in MeCy.

FIG. 5

Table 6. GC-MS analysis of ethylene homopolymerization reaction mixtures.

| entry | rxn temp. /°C | t/ min | HBPE yield (g) | Oligomer, g[c] | Oligomer/ product yield[c] | α-olefin, g[c] | α-olefin product yield[c] | C6= wt%[d] | C8= wt%[d] | C10= wt%[d] | C12= wt%[d] | C14= wt%[d] |
|---|---|---|---|---|---|---|---|---|---|---|---|---|
| 1 | 25 | 30 | 12.57 | 1.298 | 10.3% | 0.459 | 3.7% | 16 | 11 | 22 | 23 | 27 |
| 2 | 80 | 30 | 5.59 | 0.150 | 2.7% | 0.115 | 2.1% | 18 | 20 | 24 | 22 | 16 |
| 3 | 25 | 6 | 2.26 | 0.018 | 0.8% | 0.012 | 0.5% | 14 | 19 | 27 | 24 | 17 |

FIG. 6

HIGHLY BRANCHED, LOW MOLECULAR WEIGHT POLYOLEFINS AND METHODS FOR THEIR PRODUCTION

CROSS-REFERENCE TO RELATED APPLICATIONS

The present application is a continuation of U.S. patent application Ser. No. 16/963,731 that was filed on Jul. 21, 2020, the entire contents of which are incorporated herein by reference, which is a national stage of international application number PCT/US2019/016762 that was filed on Feb. 6, 2019, the entire contents of which are hereby incorporated by reference, which claims priority to U.S. provisional patent application No. 62/626,879 that was filed on Feb. 6, 2018, the entire contents of which are hereby incorporated herein by reference.

BACKGROUND

Polyethylenes (PEs) represent one of the most extensively used plastics worldwide. Depending on the molecular mass, molecular mass distribution, branch architecture, and branch density, polyethylenes exhibit a wide range of useful and informative properties, and this importance has stimulated both active fundamental and targeted research for decades. Typically, polyethylene syntheses target high molecular masses (>10 kg/mol), which are desirable for exceptional mechanical and rheological properties. Another potentially useful polyethylene product, low molecular mass ($M_n$), highly branched polyethylenes (HBPE), which have potential as synthetic lubricant oil alternatives, have been overlooked largely due to the lack of general and economical methods of production. The structures of low $M_n$ HBPE are mainly defined by branch pattern (methyl, ethyl, n-propyl, n-butyl, n-propyl, and long chain branches (≥C6)) and branch densities.

In order to produce HBPE from ethylene, homogeneous Ni— or Pd-catalyzed "chain-walking" polymerizations (CWPs) or group 4 transition metal tandem oligomerizations of ethylene were developed. Ni and Pd catalysts are generally limited by low activity and thermal instability at typical polyolefin production temperatures. For the aforementioned group 4 tandem processes, there are limitations of low activity, solid side-products (high $M_n$ PE), and complex process engineering. There is currently no industrial process for the production of low molecular weight HBPE.

Despite the great success of early transition metal polymerization catalysts, their implementation in the selective synthesis of highly branched polyethylenes, especially those with low molecular mass, has been sparse. For example, constrained geometry precatalyst CGCZr, activated with $Ph_3C^+B(C_6F_5)_4^-$ ($B_{1, H}$), catalyzes ethylene polymerization in toluene to yield low $M_n$ polyethylenes with both short (ethyl, n-butyl) and some long chain branches (LCB, ≥C6). However, reported activities are low, as is the total branch density of ca. 10/1000 C. (Li, L. et al. *J. Am. Chem. Soc.* 2002, 124, 12725-12741)

SUMMARY

Low molecular weight, highly branched polyolefins (highly branched olefin oligomers) and catalyst-mediated methods of making them are provided.

Various embodiments of the branched polyolefins have a number average molecular weight of no greater than 2100 g/mol and a branch density of at least 40 branches/1000 C. The branches comprise ethyl branches and butyl branches, and typically less than 30% of the branches are odd-numbered branches and at least 60% of the end groups on the branches are vinylidene groups. Internal double bonds make up no greater than 10% of the total polyolefin unsaturation. The branched polyolefins include ethylene homopolymers and ethylene copolymers.

One embodiment of a method for making the branched polyolefins includes combining olefin monomers with a single-site organozirconium complex and a perfluoroarylborate compound in a non-polar non-coordinating solvent or a halogenated solvent, whereby the single-site organozirconium complex and perfluoroarylborate compound mediate the oligomerization of the olefin monomers into an olefin oligomer.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3A-FIG. 3D depict trends in $CGCZr+B_{1, n\text{-}octyl}$ catalyzed ethylene polymerizations. FIG. 3A shows solvent effects on oligomer branch densities in $CGCZr+B_{1, n\text{-}octyl}$ catalyzed ethylene polymerizations. FIG. 3B shows solvent effects on oligomer end group densities in $CGCZr+B_{1, n\text{-}octyl}$ catalyzed ethylene polymerizations. FIG. 3C shows the relationship between polyolefin $M_n$, polyolefin yield, and reaction time in MeCy. FIG. 3D shows the relationship between oligomer $M_n$, oligomer yield, and reaction time in $CGCZr+B_{1, n\text{-}octyl}$ catalyzed ethylene polymerizations.

FIG. 4A. Viscosity and viscosity index (VI) of saturated HBPE and PAO4 oils. VI measures the viscosity stability with temperature change, a higher VI indicating a smaller change in viscosity with increasing temperature and greater thermal stability. Dynamic viscosities (DV) of the samples at 40° C. and 100° C. were determined by the density and kinematic viscosity data as per ASTM. FIG. 4B. Elastohydrodynamic lubrication (EHL) evaluations of film thickness vs. entrainment speed. The EHL tests were performed using a steel ball in contact with a glass disc under a 20 N load. Tests were performed under pure rolling conditions in which the ball and disc rotated at the same speed. The entrainment speed is the average speed of the ball and disc, and is the rate at which lubricant enters the contact area. FIG. 4C. Friction as a function of speed and time. A speed-ramp test was conducted at 1, 10, and 100 mm/s, represented by letters 'i', 'ii', and 'iii', respectively, to evaluate the oils in different regimes of lubrication for time intervals of 15 minutes each, for a total test time of 45 minutes.

FIG. 5. Table 1 showing the ethylene polymerization data from the Example.

FIG. 6. Table 6 showing GC-MS analysis of ethylene homopolymerization reaction mixtures from the Example.

DETAILED DESCRIPTION

Low molecular weight, highly branched polyolefins, including low molecular weight, highly branched homo- and copolymers of polyethylene (HBPE), are provided. Also provided are catalyst-mediated methods of making the low molecular weight, highly branched polyolefins and a catalyst system for carrying out the methods.

Figure 1:
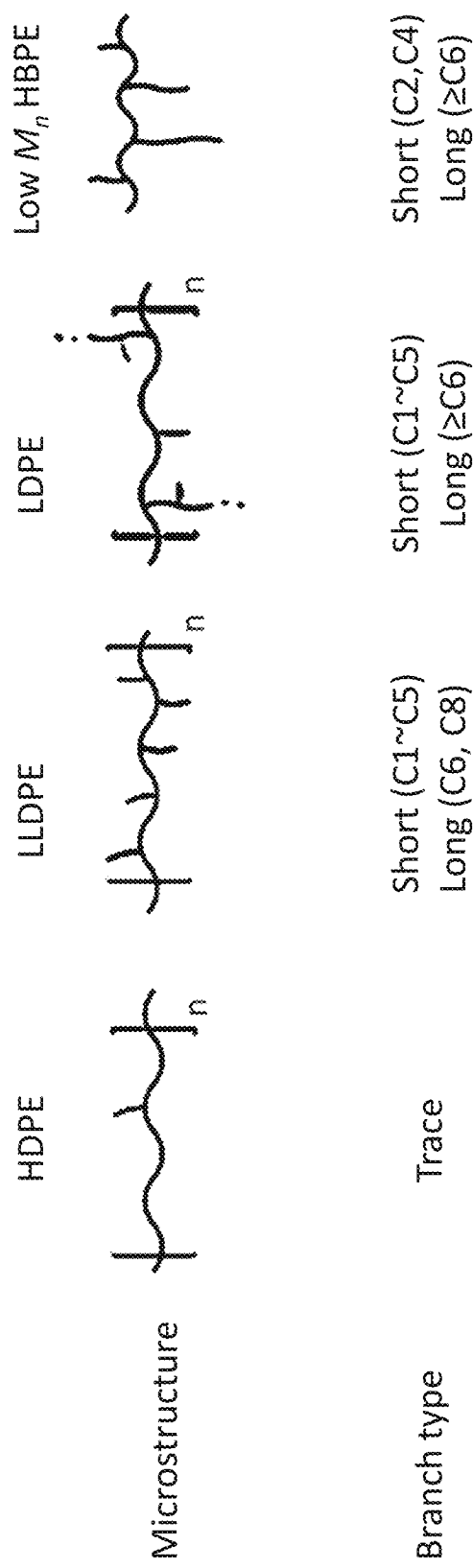
FIG. 1 depicts polyethylene categories and typical branch types.

An illustrative comparison of the microstructure, including typical branch types, of low molecular weight HBPEs with high-density polyethylene (HDPE), linear low-density polyethylene (LLDP), and low-density polyethylene (LDPE) is provided in FIG. 1.

Figure 2:
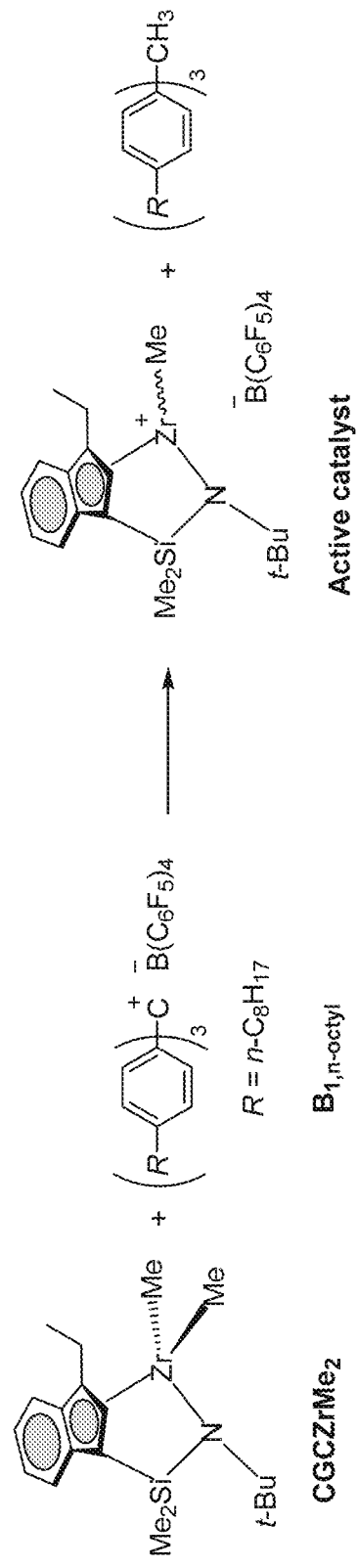
FIG. 2. Precatalyst $CGCZrMe_2$+ cocatalyst/activator $B_{1,n\text{-}octyl}$ activation process to yield the active ion-paired active olefin polymerization catalyst.

The catalyst system, which is a homogeneous catalytic system that includes a single-site organozirconium complex and the hydrocarbon-soluble perfluoroarylborate co-catalyst, is highly active for the oligomerization of olefin monomers in non-polar media. The perfluoroarylborate compound has the structure:

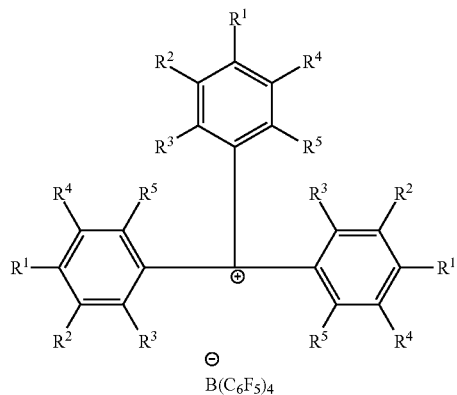

where: each $R^1$, $R^2$, $R^3$, $R^4$, and $R^5$ is independently chosen from —H, F, Cl, substituted or unsubstituted $(C_4-C_{40})$alkyl, substituted or unsubstituted $(C_4-C_{40})$alkenyl and substituted or unsubstituted $(C_4-C_{40})$cycloalkyl, wherein the substituted $(C_4-C_{40})$alkyl and substituted $(C_4-C_{40})$cycloalkyl are substituted with one or more $R^S$, where each $R^S$ is chosen from $(C_1-C_{20})$alkyl and halogen; provided that at least one of $R^1$, $R^2$, $R^3$, $R^4$, or $R^5$ is chosen from substituted or unsubstituted $(C_4-C_{30})$alkyl and substituted or unsubstituted $(C_4-C_{40})$cycloalkyl. One embodiment of the perfluoroarylborate compound, has an n-$C_8H_{17}$ group at the para positions of the benzene rings. The structure of this compound, which is referred to as $B_{1, n\text{-}octyl}$, along with the structure of the single-site organozirconium complex referred to as CGCZr are shown in the left panel of FIG. 2.

Polyolefins that can be formed using the methods described herein include, but are not limited to, homopolymers and copolymers of ethylene, propylene, 1-hexene, and/or 1-octene. The polyolefins are characterized by a high degree of branching and low molecular weights. By way of illustration, various embodiments of the low molecular weight polyolefins, including various embodiments of the low molecular weight ethylene homopolymers and copolymers, have a branch density of at least 40 branches/1000 C. This includes embodiments of the low molecular weight polyolefins having a branch density of at least 50 branches/ 1000 C, at least 60 branches/1000 C, at least 70 branches/ 1000 C, at least 80 branches/1000 C, and at least 90 branches/1000 C. For example, the polyolefins may have a branch density in the range from 50 to 100 branches/1000 C. The branch density for the polyolefins can be measured from the $^1$H NMR intensity ratio of methyl groups versus the overall integral, as illustrated in the Example.

The branches of the polyolefins can include short chain branches (SCBs), long chain branches (LCBs), or a combination thereof. For the purposes of this disclosure, an SCB refers to an alkyl chain having five or fewer carbon atoms. Ethyl and butyl groups are examples of SCBs. An LCB refers to an alkyl chain having six or more carbon atoms. Generally, the polyolefins will include ethyl branches and butyl branches, but few, if any odd-numbered branches. As used herein, the term "odd-numbered branches" refers to alkyl group branches where the alkyl group has an odd number of carbon atoms in the chain. Thus, methyl group branches (one carbon atom) and propyl group branches (3 carbon atoms) are odd-numbered branches. Some embodiments of the polyolefins have no more than 30% odd-numbered branches. This includes embodiments having no more than 15% odd-numbered branches, embodiments having no more than 5% odd-numbered branches, embodiments having no more than 1% odd-numbered branches, and embodiments that have no odd-numbered branches.

As illustrated in the Example, the relative number of LCBs and SCBs on a given branched polyolefin can be tailored by adjusting the polymerization conditions (e.g., temperature and time), the comonomers, and/or the polymerization solvent. By way of illustration, in various embodiments of the low molecular weight polyolefins, including various embodiments of the low molecular weight ethylene homopolymers and copolymers, LCBs account for at least 20% of the branches and SCBs, such as ethyl branches and butyl branches, account for no more than 80% of the branches. This includes embodiments of the polyolefins in which LCBs account for at least 30% of the branches and SCBs account for no more than 70% of the branches. For example, the polyolefins include those in which LCBs account for 30% to 50% of the branches and SCBs account for 50% to 70% of the branches.

The terminal groups on the polyolefin branches, which include carbon-carbon double bonds, may be vinyl groups ($H_2C$=$C(H)$—R), vinylidene groups ($H_2C$=$CRR'$), or a combination thereof, where R and R' represent alkyl/ polymeryl moieties). In some embodiments of the polyolefins, vinylidene groups dominate the terminal groups on the branches. By way of illustration, in various embodiments of the low molecular polyolefins, including various embodiments of the low molecular weight ethylene homopolymers and copolymers, at least 60% of the terminal groups of the branches are vinylidene groups. This includes embodiments of the polyolefins in which at least 70% of the terminal groups of the branches are vinylidene groups, and further includes embodiments of the polyolefins in which at least 80% of the terminal groups of the branches are vinylidene groups. The polyolefins may also be characterized by a very low number of internal double bonds (e.g., R'HC=CHR" and R"HC=CRR' double bonds, where R, R', and R" represent alkyl/polymeryl moieties). By way of illustration, in various embodiments of the low molecular polyolefins, including various embodiments of the low molecular weight ethylene homopolymers and copolymers, internal double bonds make up no more than 5% of the total polyolefin saturation. This includes embodiments of the polyolefins in which internal double bonds make up no more than 2% or no more than 1% of the total polyolefin saturation.

The polyolefins can be made with low molecular weights and, therefore, can be referred to as oligomers. By way of illustration, various embodiments of the low molecular polyolefins, including various embodiments of the low molecular weight ethylene homopolymers and copolymers, have a number average molecular weight ($M_n$) of no greater than 10000 g/mol. This includes embodiments of the polyolefins having a $M_n$ of no greater than 5000 g/mol, no greater than 3000 g/mol, no greater than 2100 g/mol, or no greater than 1200 g/mol. For example, some embodiments of the polyolefins have a $M_n$ in the range from 400 to 2100 g/mol. The $M_n$ of the polyolefins can be determined from the $^1$H NMR intensity ratio of the unsaturated terminal groups versus the overall integral, as illustrated in the Example and explained below.

The branched polyolefins are formed by combining the olefin monomers with the single-site organozirconium complex and the perfluoroarylborate compound co-catalyst in a non-polar organic solvent for a time sufficient to polymerize the monomers. Polymerization can be carried out at room temperature (~23° C.). However, because the catalyst system is thermally stable, the polymerization can also be conducted at elevated temperatures of, for example, up to 60° C. or higher. The polyolefins can be formed in a relatively short reaction time, including reaction times of 60 minutes or less. For example, reaction times in the range from 2 minutes to 40 minutes can be used.

The use of a highly non-polar non-coordinating solvent is desirable because such solvents can increase the polymerization activity and/or increase the polyolefin branch density relative to that of polyolefins that are formed in aromatic hydrocarbons, such as toluene, or a more polar halogenated solvent, such as chlorobenzene (PhCl). A non-polar non-coordinating solvent is differentiated from toluene in that it is a saturated hydrocarbon compound that does not include any double bonds or aromatic unsaturation. Suitable non-polar non-coordinating solvents include, but are not limited to, pentane, hexane, heptane, octane, methylcyclohexane (MeCy), cyclohexane, and Isopar-E. As illustrated in the Example, using the polymerization methods described herein, ethylene homopolymerization can be carried out with an activity of 2000 kg (mol of metal)$^{-1}$ h$^{-1}$ atm$^{-1}$ or higher (for example, in the range from 2000 to 3000 kg (mol of metal)$^{-1}$ h$^{-1}$ atm$^{-1}$) and ethylenel-hexene copolymerization can be carried out with an activity of 3400 kg (mol of metal)$^{-1}$ h$^{-1}$ atm$^{-1}$ or greater (for example, in the range from 3400 to 5000 kg (mol of metal)$^{-1}$ h$^{-1}$ atm$^{-1}$).

MeCy is particularly useful due to its highly non-polar non-coordinating character. As illustrated in the Example, the CGCZr+B$_{1, n\text{-}octyl}$ co-catalyst system shows remarkable aliphatic solvent effects on catalytic activity and branch density in the product polyolefins, with a very high activity, when the polyolefins are formed in a MeCy solution. Optionally, the polyolefins can be post-functionalized by reacting the terminal double bonds on the branches with various reactive molecules to form branch end-functionalized polyolefins with novel branched structures and/or block copolymers with unique physical properties. The C=C bonds of the unsaturated polyolefins can also be hydrogenated to form fully or partially saturated polyolefins.

Once formed, the low molecular weight, highly branched polyolefins can be used in a variety of applications, including as synthetic lubricant base oils and as feedstocks or building blocks for the production of other chemicals, or as fuels, plasticizers, or polymer processing additives.

EXAMPLE

This example demonstrates a borate co-catalyst B$_{1, n\text{-}octyl}$ (FIG. 2) with long alkyl chains introduced on the para positions of the Ph$_3$C$^+$ phenyl groups. B$_{1, n\text{-}octyl}$ has excellent solubility in industrially preferred aliphatic solvents such as MeCy. Dramatic solvent effects were observed for CGCZr+ B$_{1, n\text{-}octyl}$-catalyzed olefin polymerization. Solvent polarity increased in the order of MeCy<toluene<PhCl with dielectric constants of 2.02, 2.38 and 5.62, respectively. The activity, however, was much higher in more polar PhCl and less polar MeCy than in toluene. Unprecedented low $M_n$, highly branched, olefin-terminated polyolefins were produced with very high activity. CGCZr+B$_{1, n\text{-}octyl}$-catalyzed ethylene polymerization occurred with activities of 3393 and 2516 kg·(mol of metal)$^{-1}$·h$^{-1}$·atm$^{-1}$ in PhCl and MeCy respectively, which were 4.3× and 3.2× higher than that in toluene (Table 1, entries 1, 4 vs. 2). In comparison, no activity was observed when B$_{1, H}$ was used as the co-catalyst in MeCy, likely reflecting the insolubility of B$_{1, H}$ in MeCy (Table 1, entry 3).

In addition to modifying polymerization activity, the reaction solvent had a dramatic influence on the product branch identities/densities, product molecular weight, and product end group ratio. Switching from PhCl to MeCy resulted in a dramatic change from linear to highly branched oligomers (FIG. 3A). The product obtained in MeCy had 61 branches/1000 C, which was higher than the products obtained in PhCl and toluene (36 and 25 branches/1000 C, respectively, Table 1, Entries 4 vs. 1 and 2). The high n-butyl and LCB branch densities were unprecedented, considering that ethylene was the only monomer and that the reaction took place in a single batch reactor with a single catalyst system. Note that LCB content was remarkably high in comparison to Ni/Pd catalyzed CWP. The latter produces polyolefins with predominantly short chain methyl, ethyl, and n-propyl branches. (See, Wiedemann, T., et al., J. Am. Chem. Soc. 2014, 136, 2078-2085.) Interestingly, negligible branches with odd numbers of carbons were present in the present products, indicating that a coordination-insertion mechanism, rather than a CWP mechanism, predominated. Solvent effects on molecular weight were also observed. The low molecular weight was well beyond the detection limit of GPC; thus, polyolefin Ma was calculated based on $^1$H NMR. Polyolefin molecular weight increased in the order of toluene<MeCy<PhCl, which were 430, 700, and 2080 g/mol, respectively. Thus, this catalyst+co-catalyst system allows for the synthesis of polyolefins with a wide range of molecular weights.

Another major difference resulting from solvent choice was the product end group ratio (Table 3, FIG. 3B). In all the solvents studied here, polyolefins obtained from CGCZr+ B$_{1, n\text{-}octyl}$ contained predominantly terminal double bonds (vinyl and vinylidene); internal double bonds represented less than 4% of the total unsaturation present. While the polyolefin obtained in toluene had predominantly vinyl end groups (80%), the polyolefin obtained in MeCy contained predominantly vinylidene end groups (81%) together with vinyl end groups (18%). This sharply contrasts with late transition metal catalysis (Pd/Ni), which yield polyolefins with predominantly internal double bonds. Terminal double bond functionality is often more desirable than internal double bonds for post-reaction functionalization. Thus, the oligomer product in this example may undergo direct post-functionalization in comparison to products from other processes.

Figure 3C:
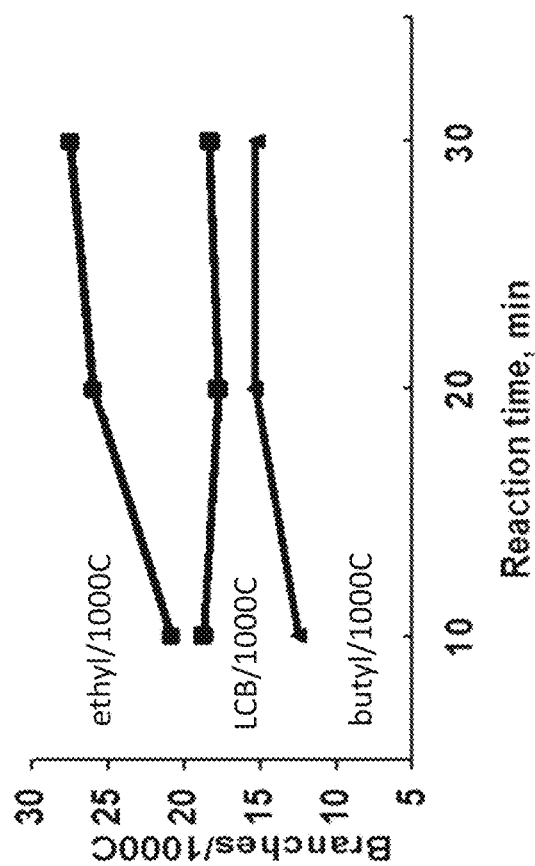
Figure 3D:
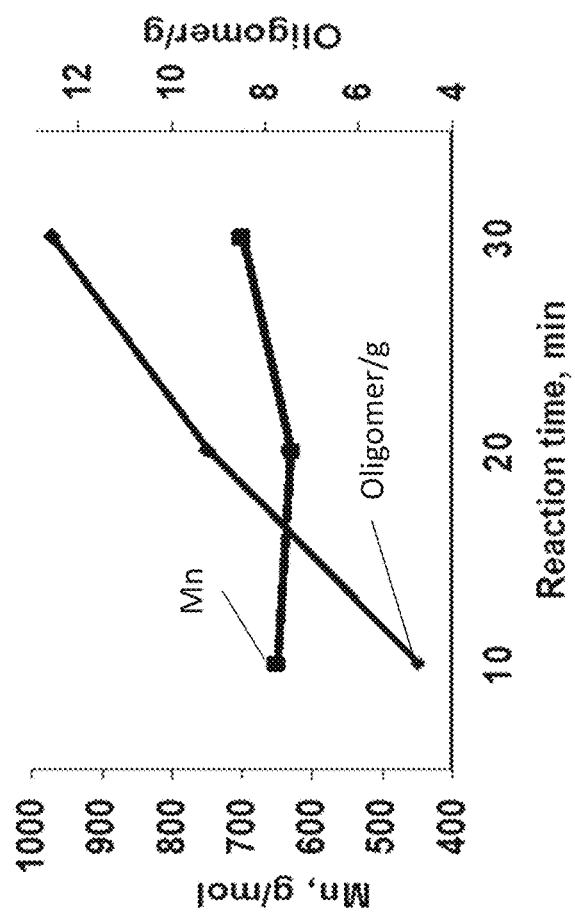

When the reaction time for CGCZr+B$_{1,\ n\text{-}octyl}$-mediated ethylene oligomerization was increased from 10 to 30 min in MeCy at 25° C., the oligomer yield increased in approximate proportion to the reaction time, accompanied by a slight decrease in activity (Table 1, shown in FIG. 5, entries 4-6). Remarkably, branch density and M$_n$ were virtually time-independent (FIG. 3C and FIG. 3D).

Thermal stability of the active catalyst is also a critical parameter in evaluating a catalyst system's potential applications. CGCZr+B$_{1,\ n\text{-}octyl}$ in MeCy showed a steady 30-min activity up to polymerization temperatures of at least 60° C. At a polymerization temperature of 80° C., the activity dropped by 55%, and the product polyolefin had a lower branch density (38 vs. 61 branches/1000 C at 80° C. vs. 25° C., Table 1, entries 9 vs. 4). The decreased solubility of ethylene with increasing temperature likely contributed, in part, to the fall in activity. Polyolefin M$_n$ increased 1.5× with increasing temperature, indicating suppressed chain termination relative to the chain propagation process. Interestingly, internal double bond ratios for the present systems were consistently lower than 2%, suggesting that little double bond isomerization occurs even at 80° C.

Next, 1-hexene comonomer was introduced in ethylene polymerizations to determine the effect on product branch pattern and density and the flexibility in tuning product compositions (Table 1, entries 10-13). Ethylene/1-hexene copolymerization activity increased 4.7× by switching the solvent from toluene to MeCy (entries 9 vs. 10). Solvent effects were analyzed at similar polyolefin-yield levels to minimize the influence of comonomer concentration changes throughout the polymerization. On changing the solvent from toluene to MeCy, ethyl and n-butyl branch densities increased 2.6× and 2.4×, respectively, concurrent with essentially unchanged LCB density (entries 9 vs. 10). In ethylene homopolymerizations, however, LCB density increased by about twice when the solvent was changed from toluene to MeCy (entries 3 vs. 1). This indicates that enhancement of 1-hexene incorporation competes with LCB incorporation, providing a facile means to adjust highly branched polyethylene microstructures by introducing inexpensive α-olefin monomers.

Small amounts of 1,2-difluorobenzene (DFB, 60 equiv. per metal) were added to the polymerization solution to promote solubility of co-catalyst B$_{1,\ H}$ in preparing active catalyst solutions. This represented about 1.2% v/v of DFB in the polymerization solution. The ethylene polymerization results showed minimal change after adding small amounts of this relatively high polarity halogen-containing solvent in terms of activity, polyolefin molecular weight, and product branch densities (Table 1).

TABLE 1

Ethylene Polymerizations with and without 60 equiv. of DFB per Metal Catalyst.

| Entry | Solvent | Additive | Cocat. | Polymer (g) | act[b] | M$_n$ (g/mol)[c] | Branches/ 1000 C[d] |
|---|---|---|---|---|---|---|---|
| 1 | Tol | none | B$_{1,\ n\text{-}}$ | 3.96 | 790 | 430 | 25 |
| 2 | Tol | DFB | B$_{1,\ n\text{-}}$ | 2.53 | 506 | 419 | 18 |
| 3 | MeCy | none | B$_{1,\ n\text{-}}$ | 12.57 | 2516 | 700 | 61 |
| 4 | MeCy | DFB | B$_{1,\ n\text{-}}$ | 13.36 | 2672 | 687 | 55 |
| 5 | MeCy | DFB | B$_{1,\ H}$[e] | 8.45 | 1689 | 652 | 58 |

Conditions: catalyst, CGCZr, 10 µmol; cocatalyst, 10 µmol; ethylene, 1 atm; water bath, 25° C.; solvent: toluene or MeCy, 50 mL; 1.2‰ v/v of DFB used (60 equiv./metal) for entries 2, 4 and 5.
[b]Unit is kg · (mol of metal)$^{-1}$ · h$^{-1}$ · atm$^{-1}$.
[c]M$_n$ calculated from $^1$H NMR intensity ratio of unsaturated end groups vs. overall integral.
[d]Branches/1000 C calculated from $^1$H NMR intensity ratio of methyl groups vs. overall integral.
[e]likely due to precipitation of active catalyst when MeCy is introduced.

Note that the products obtained in this study structurally resembled poly(α-olefin)s (PAOs). PAOs, oligomers of 1-decene and 1-dodecene, are important commercial synthetic lubricant base oils that provide better performance than petroleum-based lubricant base oils. The superior performance of PAOs derives from their unique branched microstructure, i.e., multiple long chain branches on a short backbone core. The oligomers produced in the present example had high branch densities, with particularly high LCB densities, and topologically resembled PAOs. Product oligomer Mas were in the range 500-2100 g/mol, close to those of commercial PAOs. To evaluate the oligomers for lubricant oil performance, the viscosity and viscosity index were measured and compared to that of commercial lubricants. Kinematic viscosity (40° C. and 100° C.) and viscosity index of the sample in entry 13, Table 1, were similar to those of a commercial lubricant 5W30 blend (Table 4) demonstrating the usefulness of the oligomers produced here as a PAO alternative. One significant advantage of these oligomers over conventional PAOs is their low cost, since they are obtained directly from inexpensive ethylene, and in some cases, with less expensive α-olefins, such as 1-hexene. In contrast, PAOs are currently produced from 1-decene/1-dodecene oligomerization processes, and the high cost of 1-decene/1-dodecene produced from statistical ethylene oligomerization/separation significantly increases the cost of PAO. In addition, the HBPE samples in the current example contained predominantly terminal double bonds, which are ideal starting materials for further functionalizations to important intermediates with novel branched structures, such as surfactants. Terminal double bond functionality is more desirable than internal double bonds for direct post-functionalization since it doesn't require a second catalyst to convert/isomerize internal double bonds to terminal double bonds. For the same reasons, the subject invented materials could also be used as building blocks for the preparation of block copolymers that have unique physical properties/applications.

Tribology. HBPE Vs. PAO4 and Potential Applications.

Figure 4B:
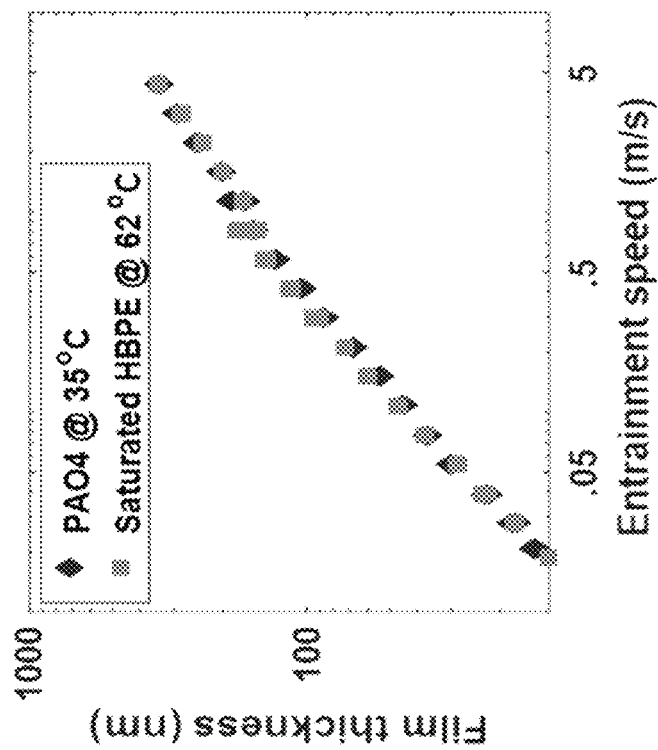
FIG. 4A-FIG. 4C. Tribological evaluations of the $CGCZrMe_2+B_{1,n\text{-}octyl}$ catalyzed ethylene homo-polymerization product HBPE vs. commercial poly-α-olefin (PAO4) base oil lubricant.
Figure 4A:
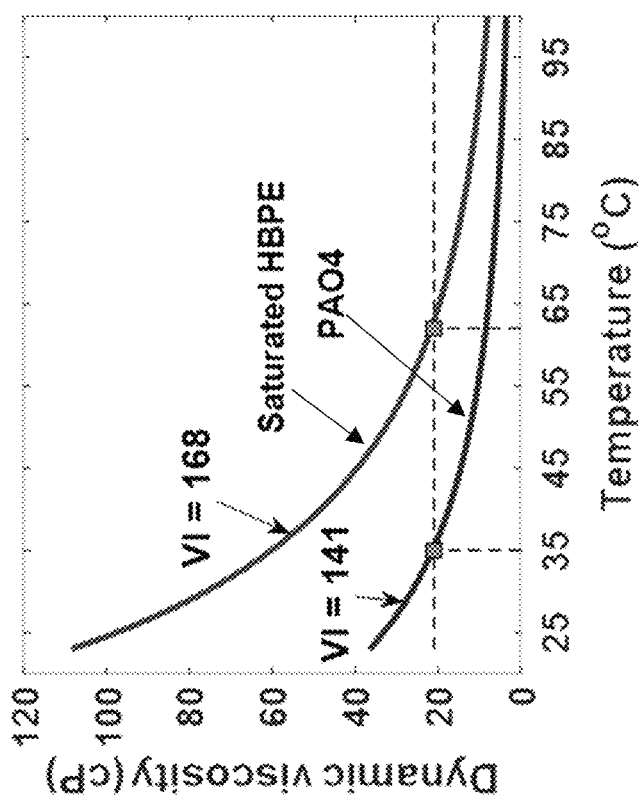
Figure 4C:
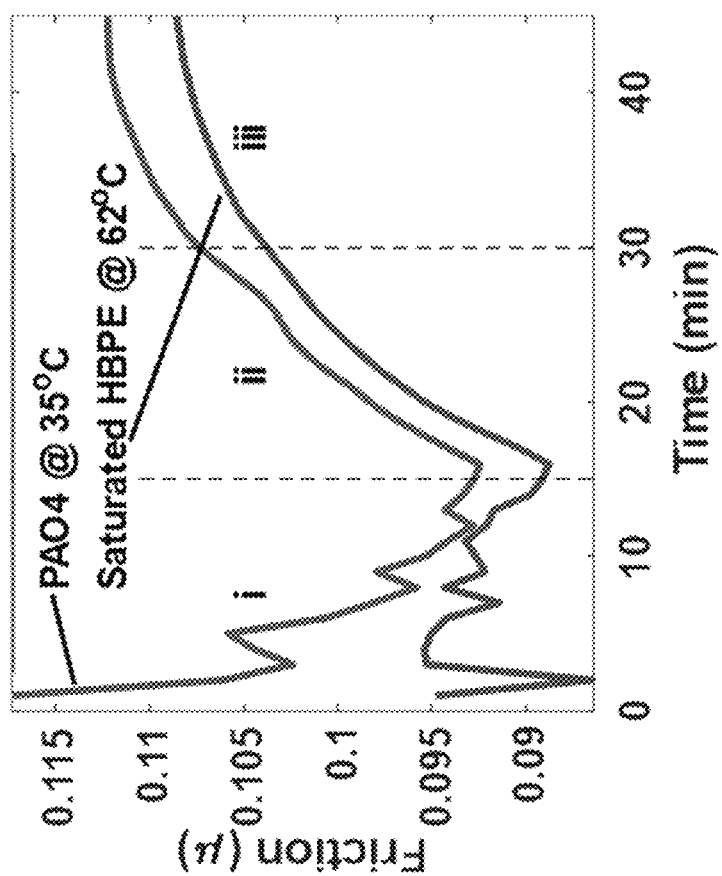

The HBPE products not only had high branch densities but had particularly high LCB densities. Furthermore, their M$_{nS}$ of 500-1200 g/mol are within the range of commercial high-performance PAO lubricants. To rigorously evaluate the tribological performances of the HBPEs, such as viscosity characteristics, film stability, and friction reduction ability vs. commercial PAO4, the HBPE C=C bonds were hydrogenated to afford a fully saturated HBPE. Viscosities were then measured, and viscosity indices calculated, while a PCS elastohydrodynamic lubrication (EHL) system (PCS Instruments) was used for both film thickness and traction analyses at identical viscosities by adjusting the measurement temperature: 62° C. for saturated HBPE, 35° C. for PAO4. FIG. 4A shows the viscosities of the saturated HBPE and PAO4 oils vs. temperature and the corresponding viscosity index numbers, indicating that the viscosity index for the saturated HBPE is significantly greater than that for PAO4, and that the viscosity of the former is more stable over a wide temperature range. FIG. 4B compares the lubrication film thicknesses for saturated HBPE and PAO4 at a constant viscosity, showing comparable film thickness, and thus a comparable lubricity over the entire speed range evaluated. Two sets of speed-ramp pin-on-disk friction tests were next conducted for the two lubricants in different regimes of lubrication at 62° C. and 35° C., which are again at the equalized viscosities to ensure a fair comparison. FIG. 4C shows that saturated HBPE consistently delivers lower friction than PAO4. Taken together, these results demonstrate that saturated HBPE offers superior tribological performance, and also indicates that saturated HBPEs of optimized molecular masses would have still higher viscosity indices, greater lubrication capacity, and lower friction than corresponding commercial PAOs.

Materials and Methods

All manipulations of air-sensitive materials were performed with rigorous exclusion of $O_2$ and moisture in oven-dried Schlenk-type glassware on a dual manifold Schlenk line, interfaced to a high-vacuum line ($10^{-6}$ Torr), or in a $N_2$-filled MBraun glove box with a high-capacity recirculator (<1 ppm $O_2$). Argon (Airgas, pre-purified grade) was purified by passage through a supported MnO oxygen-removal column and an activated Davison 4 Å molecular sieve column. Ethylene (Airgas) was purified by passage through an oxygen/moisture trap (Matheson, model MTRP-0042-XX). Hydrocarbon solvents (n-pentane, n-hexane, 1-hexene, methylcyclohexane, and toluene) were dried using activated alumina columns according to the method described by Grubbs and were then vacuum-transferred from an Na/K alloy. (Pangborn, A. B., et al., *Organometallics* 1996, 15, 1518-1520.) Benzene-$d_6$ and toluene-$d_8$ (Cambridge Isotope Laboratories, 99+ atom % D) were stored over the Na/K alloy in vacuum and vacuum-transferred immediately prior to use. 1,2-Difluorobenzene and chlorobenzene-$d_5$ were dried with $CaH_2$ and distilled under vacuum. Chloroform-$d_3$ and 1,1,2,2-tetrachloroethane-$d_2$ were used as received (Cambridge Isotope Laboratories, 99+ atom % D).

Physical and Analytical Measurements

NMR spectra were recorded on Varian UNITY Inova-500 (FT, 500 MHz, $^1H$; 125 MHz, $^{13}C$), UNITY Inova-400 (FT, 400 MHz, $^1H$; 100 MHz, $^{13}C$), Agilent DD2-HCN600 (FT, 600 MHz, $^1H$; 150 MHz, $^{13}C$) or Bruker ASCEND-400 (FT, 400.13 MHz, $^1H$; 100.60 MHz, $^{13}C$). Chemical shifts for $^1H$ and $^{13}C$ spectra were referenced using internal solvent resonances and were reported relative to tetramethylsilane (TMS). NMR experiments on air-sensitive samples were conducted in Teflon valve-sealed sample tubes (J-Young). Elemental analyses (CHN) were performed by Midwest Microlab, Indianapolis, Ind. $^{13}C$ NMR analysis of the polymer microstructure was conducted in 1,1,2,2-tetrachloroethane-$d_2$ at 120° C. with delay time ($d_1$)=10 sec. To avoid any detectable double bond isomerization, $^1H$ NMR spectra were generally recorded first (within ~2 min) followed by $^{13}C$ NMR (~30 min). When a subsequent $^1H$ NMR spectrum was recorded after $^{13}C$ NMR, the spectrum was still the same as previously recorded, which suggests negligible isomerization during high-temperature polymer analysis.

Synthesis of Compounds

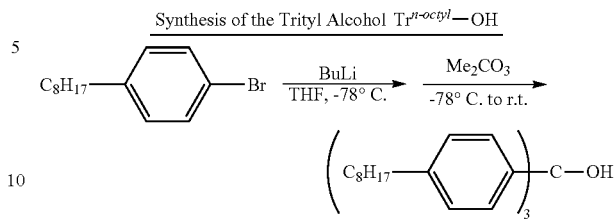

Synthesis of the Trityl Alcohol Tr$^{n\text{-}octyl}$—OH

Tr$^{n\text{-}octyl}$-OH was synthesized following a literature procedure. (Thibeault, D., et al. *Eur. J. Org. Chem.* 2010, 3049-3067) N-BuLi (11.5 mmol, 4.6 mL, 2.5 M in hexanes) was added slowly via syringe to a THF (50 mL) solution of p-octylbromobenzene (3.10 g, 11.5 mmol) at −78° C. The reaction was kept at −78° C. for 0.5 h. Next, $Me_2CO_3$ (0.33 g, 3.64 mmol, 0.31 mL) was added to the solution via syringe, and the solution was warmed up to room temperature. After stirring overnight, water was added to quench the reaction. The mixture was extracted 3 times with $Et_2O$, and the organic extracts were combined and washed twice with brine, dried ($Na_2SO_4$), filtered, and concentrated to dryness. The resulting crude product was purified by flash column chromatography using basic aluminum oxide (activated, basic, Brockmann I, from Aldrich). Gradient elution (Hexanes, Hexanes/EtOAc=50/1, EtOAc) gave the pure product as colorless oil, 1.33 g, 58.1% yield. $^1H$ NMR (400 MHz, $C_2D_2Cl_4$) δ 7.36-7.10 (m, 12H), 2.71-2.57 (m, 6H), 1.67 (m, 6H), 1.44-1.25 (m, 30H), 1.02-0.85 (m, 9H). $^{13}C$ NMR (151 MHz, $C_2D_2Cl_4$) δ 144.16, 141.63, 127.68, 127.63, 81.85 ($Ar_3C$, weak signal, confirmed by HMBC experiment), 35.42, 31.77, 31.28, 29.37, 29.32, 29.15, 22.60, 14.14. HR-MS (ESI) Calcd for $C_{43}H_{63}$ (M-OH)$^+$: 579.4930, Found: 579.4946.

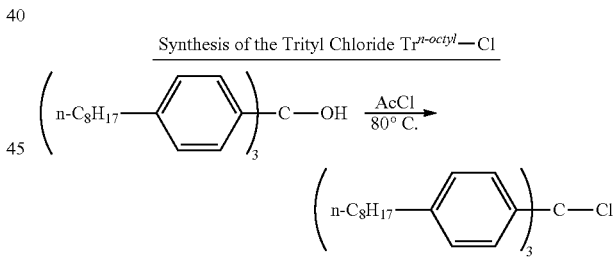

Synthesis of the Trityl Chloride Tr$^{n\text{-}octyl}$—Cl

Tr$^{n\text{-}octyl}$-Cl was synthesized based on a modified literature procedure. (Bosset, C., et al. *Angew. Chem., Int. Ed.* 2014, 53, 9860-9864.) AcCl (0.265 g, 3.37 mmol, 0.24 mL) was added via syringe to a stirred solution of Tr$^{n\text{-}octyl}$-OH (0.67 g, 1.12 mmol) in toluene (20 mL) at 80° C. The reaction was kept at 80° C. for 1 h. All volatiles were then removed, and the resulting oily product was further dried under high vacuum. The product, a light-yellow oil, was pure enough to use without further purification. Yield: 0.69 g, quantitative yield. $^1H$ NMR (499 MHz, $CDCl_3$) δ 7.13 (m, 6H), 7.09 (m, 6H), 2.59 (m, 6H), 1.61 (m, 6H), 1.41-1.16 (m, 30H), 0.88 (m, 9H). $^{13}C$ NMR (101 MHz, $CDCl_3$) δ 142.88, 142.41, 129.56, 127.58, 81.82 ($Ar_3C$, weak signal, confirmed by HMBC experiment), 35.52, 31.89, 31.26, 29.47, 29.40, 29.25, 22.67, 14.10. HR-MS (ESI) Calcd for $C_{43}H_{63}$ (M-Cl)$^+$: 579.4930, Found: 579.4936.

Synthesis of the New Soluble Co-catalyst B$_1$, $_{n\text{-}octyl}$

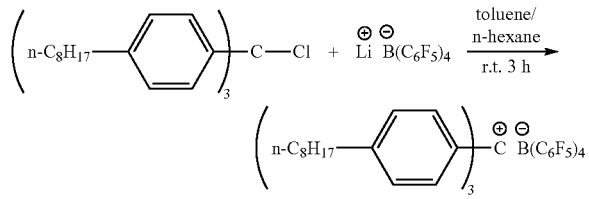

LiB(C$_6$F$_5$)$_4$ was synthesized according to the literature procedure. (Kuprat, M., et al. *Organometallics* 2010, 29, 1421-1427) LiB(C$_6$F$_5$)$_4$ (0.13 g, 0.21 mmol) and Tr$^{n\text{-}octyl}$-Cl (0.21 g, 0.25 mmol) were mixed in toluene (15 mL)/n-hexane (5 mL) in an Mbraun glovebox. After 3 hours, the solution was filtered through Celite. Toluene and hexane were removed under vacuum, and the resulting oil was washed with pentane (10 mL) twice. After drying under high vacuum, the product was collected as red oil. 0.15 g, 58% yield. $^1$H NMR (499 MHz, CD$_2$Cl$_2$) δ 7.67 (d, J=8.0 Hz, 6H), 7.55 (d, J=7.9 Hz, 6H), 2.94 (m, 6H), 1.79 (m, 6H), 1.49-1.27 (m, 30H), 0.91 (m, 9H). $^{19}$F NMR (470 MHz, CD$_2$Cl$_2$) δ−133.14 (m, m-F, 8F), −163.85 (t, p-F, 4F), −167.66 (m, o-F, 8F). Elem. Anal. Calcd for C$_{67}$H$_{63}$BF$_{20}$: C, 63.92, H, 5.04; Found: C, 64.13, H, 10.69, N, 5.42.

To a suspension of 2.14 g (6.0 mmol) of methyltriphenylphosphonium bromide in THF (24 mL) was added 2.52 mL of n-butyllithium (2.5 M in hexane) by syringe at −0° C. After 15 min, the reaction mixture was cooled to −78° C. After 15 min at −78° C., a THF (10 mL) solution of tridecan-7-one (1.27 g, 6.0 mmol) was added dropwise by syringe to the suspension. The reaction mixture was allowed to warm to room temperature and stirred overnight. The reaction mixture was quenched by addition of NH$_4$Cl solution (saturated, 2 mL), and extracted with ether (3*20 mL). The combined organic phase was dried over Na$_2$SO$_4$, the solvent was evaporated in vacuo, and the residue was purified by silica gel chromatography (hexane) to give the product. Colorless oil, 0.91 g, 77% yield. $^1$H NMR (600 MHz, CDCl$_3$): δ 4.69 (m, 2H), 2.01-1.98 (m, 4H), 1.44-1.39 (m, 4H), 1.34-1.25 (m, 12H), 0.89 (t, J=6.9 Hz, 6H); $^{13}$C NMR (150 MHz, CDCl$_3$): δ 150.46, 108.30, 36.10, 31.18, 29.14, 27.18, 22.66, 14.10. HR-MS (EI) Calcd for C$_{14}$H$_{28}$ (M$^+$): 196.2191, Found: 196.2188.

Ethylene Polymerization Experiments

In a typical experiment, a 150-mL glass pressure vessel (dried in a 120° C. oven overnight prior to use) was loaded with 40 mL of dry toluene, methylcyclohexane, or chlorobenzene inside the glovebox. A large magnetic stir bar was

Synthesis of 2-Ethyl-1-dodecene

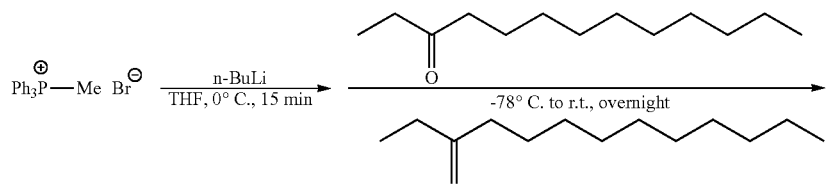

To a suspension of 2.14 g (6.0 mmol) of methyltriphenylphosphonium bromide in THF (24 mL) was added 2.52 mL of n-butyllithium (2.5 M in hexane) by syringe at −0° C. After 15 min, the reaction mixture was cooled to −78° C. After 15 min at −78° C., a THF (10 mL) solution of tridecan-3-one (1.27 g, 6.0 mmol) was added dropwise by syringe to the suspension. The reaction mixture was allowed to warm to room temperature and stirred overnight. The reaction mixture was quenched by addition of NH$_4$Cl solution (saturated, 2 mL), and extracted with ether (3*20 mL). The combined organic phase was dried over Na$_2$SO$_4$, the solvent was evaporated in vacuo, and the residue was purified by silica gel chromatography (hexane) to give the product. Colorless oil, 1.13 g, 93% yield. $^1$H NMR (600 MHz, CDCl$_3$): δ 4.70-4.68 (m, 2H), 2.04-2.00 (m, 4H), 1.44-1.39 (m, 2H), 1.31-1.24 (m, 14H), 1.02 (t, J=7.4 Hz, 3H), 0.88 (t, J=7.0 Hz, 3H). $^{13}$C NMR (150 MHz, CDCl$_3$): δ 151.91, 107.24, 36.29, 31.92, 29.65, 29.58, 29.47, 29.35, 28.74, 27.88, 22.69, 14.11, 12.39. HR-MS (EI) Calcd for C$_{14}$H$_{28}$ (M$^+$): 196.2191, Found: 196.2186.

added to the pressure vessel, and it was sealed, taken out of the glovebox, and attached to a high-pressure/high-vacuum line. The pressure vessel was cooled to −78° C. with a dry ice/acetone bath and degassed, then allowed to warm and equilibrate at the desired reaction temperature for 30 min using an external water bath. The solution was saturated with 1 atm of ethylene at the same time. The catalytically active species was freshly generated by mixing measured amounts of precatalyst and co-catalyst in a vial in the glovebox (in 10 mL of methylcyclohexane, chlorobenzene, or toluene) and mixing for 10 min. The catalyst solution was then removed from the glovebox and quickly injected into the rapidly stirring solution using a gastight syringe equipped with a spraying needle. The temperature of the solution in representative polymerization experiments was monitored using a thermocouple. After a measured time, the polymerization was quenched by addition of 0.5 mL of MeOH. All volatiles were removed from the remaining

Synthesis of 2-Hexyl-1-octene

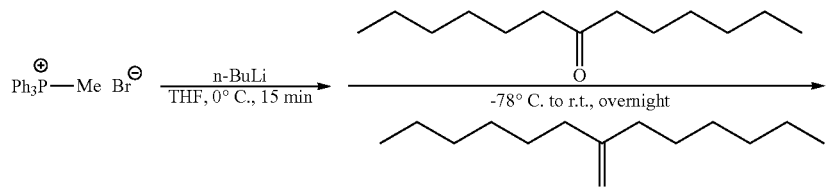

polymerization mixture, and the products were dried under high vacuum at 60° C. overnight until reaching a constant weight.

Ethylene Copolymerization Experiments

The procedure for ethylene+1-hexene co-polymerization was similar to that for ethylene homo-polymerization described above. The 150-mL glass pressure vessel was loaded with 35 mL of dry toluene, methyl cyclohexane, or chlorobenzene and 5 mL of 1-hexene inside the glovebox. The procedures for catalyst preparation, injection into the polymerization flask, and polymer workup were the same as described above.

Hydrogenation of HBPE Sample to Saturated HBPE

To a 150-mL glass pressure vessel was added unsaturated HBPE (19.3 g), Pd/C (0.15 g), 60 mL of pentane and a stir bar. The vessel was attached to a high-pressure/high-vacuum line. The pressure vessel was cooled to −78° C. with a dry ice/acetone bath and degassed, warmed to room temperature and filled with 5.0 atm of $H_2$. The reaction immediately started consuming $H_2$. The reaction was complete after overnight reaction (no $H_2$ consumption). The reaction solution was filtered through silica gel. The product was then dried under high vacuum at 60° C. for 6 h until reaching a constant weight under high vacuum. The product was obtained in quantitative yield. $^1$H NMR indicated complete hydrogenation of the olefinic double bonds in the unsaturated HBPE.

Tribology Experiments on HBPE Sample Vs. PAO4

Viscosity and Viscosity Index

HBPE was compared with standard PAO4 at the same dynamic viscosity to assess the tribological merit of the saturated HBPE. Dynamic viscosity, as the measure of the resistance to shear stress, is a key property affecting both lubrication film thickness and friction. A high dynamic viscosity value would not only yield a higher film thickness but also a higher friction because of the higher shear stress. The kinematic viscosity should first be measured in order to determine the dynamic viscosity. A Canon constant temperature bath was used to evaluate the kinematic viscosities of saturated HBPE and PAO4 samples at 40° C. and 100° C. Viscosity information at more temperature points can be extrapolated using the well-known Walther equation:

$$\log \log(v+0.7)=A-B \log T,$$

where A and B are constants to be determined in the simultaneous solving of the equations at 40° C. and 100° C., T is the absolute temperature in Kelvin, and v is the kinematic viscosity. The dynamic viscosity is calculated by multiplying the kinematic viscosity by the density. Using this equation, along with the density information at 40° C. and 100° C., a routine was written to determine the required temperatures at which the saturated HBPE and PAO4 render the same viscosities within 0.4 cP of accuracy. FIG. 4A (Viscosity and viscosity index (VI) of saturated HBPE and PAO4 oil) shows viscosities of the oils and the respective temperatures needed to match the viscosities. The routine determined that at the temperatures 62° C. and 35° C. for the saturated HBPE and PAO4, respectively, each had a dynamic viscosity of 21 cP.

Elastohydrodynamic Lubrication (EHL) Evaluation at the Same Viscosity

A PCS EHL system was used for film thickness measurements. Each film thickness test used a ball of 19.55 mm diameter on a glass disc under the normal load of 20N. The elastic moduli of the steel ball and optically smooth glass disc are 210 GPa and 75 GPa, respectively, yielding a baseline contact pressure of 540 MPa. Both oils were tested under the speed range of 20 mm/s to 4.3 m/s under pure rolling conditions where the steel ball rotates at the same speed as the glass disc. The tests were commenced after the temperature stabilized and was maintained consistent.

Friction Evaluation at the Same Viscosity

A CETR pin-on-disc high-temperature tribometer was used for a comparative study of the induced friction resulting from the surface-lubricant-surface interface. A polished 9.53 mm diameter M-50 steel ball was used in contact with a polished 52100 steel disc. Speeds of 1 mm/s, 10 mm/s, and 100 mm/s were chosen for the speed-ramp tests to capture the boundary, mixed, and hydrodynamic lubrication regimes. Each speed was tested for 15 minutes with a smooth transition to the next speed. A load of 5N was applied to the disc, yielding a contact pressure of 820 MPa.

Molecular Weight Calculation and Branching Analysis from $^1$H NMR $M_n$ and branching density based on $^1$H NMR were analyzed according to literature procedures, and all equations are listed below. (Wiedemann, T., et al., *J. Am. Chem. Soc.* 2014, 136, 2078-2085) Since all polymers have very low $M_n$, $N_{Me\ groups}/1000$ C was corrected for methyl end groups in the chain, which should not be counted as branches. Since most polymers in the present study had >99% terminal double bonds, $N_{Me\ groups}/1000$ C were therefore corrected with one methyl group for each chain.

$$N_{Me\ groups/1000C}=2\times I_{Me}/(3\times I_{tot})\times 1000$$

$$N_{Branches/1000C}=N_{Me\ groups/1000C}-1000\times 14/M_n$$

Branching Analysis from $^{13}$C NMR

Percentages of different branch lengths were calculated from $^{13}$C NMR (Table 3). The branching densities of polyethylene and poly(ethylene-co-1-hexene) samples were analyzed based on modified methods of Galland et al, assuming one double bond per macromolecule. (Galland, G. B., et al. *Macromolecules* 1999, 32, 1620-1625). The percentages were estimated by analyzing those ethyl, butyl, and long chain branches that are not influenced by proximate olefinic double bonds, assuming the percentages of 2-alkyl branches, including ethyl, butyl and long chain branches, are similar to those that are not influenced by olefin double bond[2]. In this analysis, peak symbol and numbering are the same as in Galland et al. (1999). In this analysis, $N_E$, $N_B$, and $N_{L,\ total}$ represent the branching content of ethyl, n-butyl, and long chain (C≥6) branches, respectively. In represents the integral of the n-peak. Therefore, a few modifications were made, as shown below. Ethyl, n-butyl, and long chain branch content calculations are shown below:

$$N_E=(I_1+I_{10}+I_{33})/3$$

$$N_B=I_8.$$

As for long chain branches $N_{L,\ total}$, according to Galland method, $I_{31}=k(N_B+N_4+N_L)$; $N_B=I_8$; $I_{21}=kN_4$, and $I_{21}=0$ for all the samples; $I_{19}=k2N_{L(1,4)}$, and $I_{19}=0$ for all the samples, indicating no paired long chain branches, thus, $$N_{L,total}=I_{31}-I_8+I_{19}/2=I_{31}-I_8.$$

While the above Galland equation provides reasonable results for ethylene homopolymer samples, it does not give reasonable $N_{L,\ total}$ data for ethylene copolymer samples. The integral of $I_{31}$ (butyl, amyl, and long chain branches) is often smaller than that of $I_8$ (butyl), which indicates that the large ratio of butyl branches is not proportionally reflected in $I_{31}$ and $I_8$. Thus, in calculating $N_{L,\ total}$ for the present ethylene copolymer samples, $I_{19}$ and $I_{20}$ were used instead of $I_8$ and $I_{31}$. According to the Galland method, $I_{20}=k(N_L+2N_{L(1,4)})$ and $I_{19}=k2N_{L(1,4)}$, for which $N_L$ means unpaired or isolated long chain branches. Thus, long chain branches of copolymer samples were analyzed based on the following equation:

$$N_{L,total}=N_L+N_{L(1,4)}=I_{20}-I_{19}/2(I_{19}=0 \text{ for all the samples}).$$

Percentages of ethyl, n-butyl, and LCB ratios are then calculated from the above $N_E$, $N_B$, and $N_L$ values.

TABLE 2

13C NMR Peak Assignments

| peak no. | $I_1$ | $I_8$ | $I_{10}$ | $I_{16}$ | $I_{19}$ | $I_{20}$ | $I_{31}$ | $I_{33}$ |
|---|---|---|---|---|---|---|---|---|
| δ (ppm) | 11.10 | 23.42 | 26.83 | 30.00 | 31.50 | 32.23 | 38.24 | 39.72 |
| assignment | $1B_2$ | $2B_4$ | $2B_2$ | $\delta B_{1-n}$ | 1,4-α'Bn | $3B_n$, $3B_n$ | 1,4-$brB_4$, $brB_n$ | $brB_2$ |

Polymer End-Group Analysis

End-group analysis was based on $^1H$ NMR. Vinyl, vinylidene groups, and internal double bonds were assigned and quantified according to the literature. (Wiedemann, T., et al., *J. Am. Chem. Soc.* 2014, 136, 2078-2085.)

TABLE 3

End Group Analysis of Samples in Table 1.

| Entry | Solvent | $T_p/°C$ | t/min | Vinyl/% | Vinylidene/% | Internal/% |
|---|---|---|---|---|---|---|
| 1 | PhCl | 25 | 30 | 98 | 2 | 0 |
| 2 | T | 25 | 30 | 80 | 16 | 4 |
| 3 | MeCy | 25 | 30 | — | — | — |
| 4 | MeCy | 25 | 30 | 18 | 81 | 1 |
| 5 | MeCy | 25 | 20 | 26 | 73 | 1 |
| 6 | MeCy | 25 | 10 | 35 | 64 | 1 |
| 7 | MeCy | 40 | 30 | 19 | 79 | 1 |
| 8 | MeCy | 60 | 30 | 14 | 84 | 2 |
| 9 | MeCy | 80 | 30 | 39 | 60 | 1 |
| 10 | T | 25 | 20 | 71 | 13 | 16 |
| 11 | MeCy | 25 | 4 | 38 | 61 | 1 |
| 12 | MeCy | 25 | 8 | 27 | 68 | 5 |
| 13 | MeCy | 25 | 20 | 17 | 82 | 1 |

Viscosity and Viscosity Index Test

The kinematic viscosity (KV) of the samples at 40° C. and 100° C. was determined as per ASTM D2270. Viscosity index was calculated from KV at 40° C. and 100° C.

TABLE 4

Viscosity and Viscosity Index to Compare with Commercial Lubricant Oils[a]

| Sample | Viscosity (40° C., cSt) | Viscosity (100° C., cSt) | Viscosity Index |
|---|---|---|---|
| A | 57.3 | 10.1 | 166 |
| B | 230 | 16 | 57 |
| PAO4 | 22.3 | 4.8 | 130 |
| Synthetic | 80.1 | 13 | 165 |
| Blended 5W30 | 74.4 | 12.1 | 158 |

[a]Sample A: ethylene copolymer from Table 1, entry 13; Sample B: ethylene homopolymer from Table 1 entry 4. PAO4, Synthetic and Blended 5W30 are all lubricant oils directly from lubricant companies.

GC-MS Analysis

GC-MS analysis was performed on several of the ethylene polymerization reaction mixtures. To these, a known amount of n-heptane was added as internal standard after the reaction was quenched, and a small amount of the reaction product was diluted with p-xylene for GC-MS analysis. Note that $C_6$-$C_{14}$ α-olefins are detected. Negligible butene products and only small quantities of higher oligomers ($C_n^=$, n≥16) are detected and are therefore not included in Tables 6 and 7 below. The structures of these olefin isomers were identified with the NIST database in the computer of the in-house GC-MS. 1-Hexene, 1-octene, 1-decene, 1-dodecene, 1-tetradecene, 2-ethyl-1-dodecene, 2-hexyl-1-octene were confirmed by comparing with standard samples (same retention times and MS fragmentation patterns).

To summarize these results: (i)≤10.3 wt. % of volatile oligomers were produced in the catalytic reaction for HBPE; (ii) only 0.5 wt. % of volatile α-olefins were detected in the 6 min reaction (Entry 3, Table 6), suggesting that, at the early stage of the reaction, most α-olefins are captured and enchained by the cationic Zr catalyst. When polymerizations were conducted for longer times (30 min, Entry 1, Table 6), only 3.7 wt. % of volatile α-olefins were detected, evidencing a strong binding/enchainment preference over dissociation into unbound species in solution; (iii) besides α-olefins, there are non-negligible quantities of branched olefin isomers as shown in Table 6 in FIG. 6, which parallels the branch formation process in the production of the final HBPE products.

TABLE 7

Compositions of decenes, dodecenes, and tetradecenes by GC-MS analysis[e]

| entry | a1 in $C10^=$ % | a2 in $C10^=$ % | a3 in $C10^=$ % | b1 in $C12^=$ % | b2 in $C12^=$ % | b3 in $C12^=$ % | p1 in $C14^=$ % | p2 in $C14^=$ % | p3 in $C14^=$ % | p4 in $C14^=$ % |
|---|---|---|---|---|---|---|---|---|---|---|
| 1 | 23 | 68 | 9 | 30 | 41 | 29 | 18 | 48 | 14 | 20 |
| 2 | 71 | 21 | 8 | 71 | 16 | 3 | 72 | 14 | 10 | 4 |
| 3 | 33 | 47 | 20 | 83 | 10 | 17 | 62 | 23 | 5 | 7 |

[a]Conditions: catalyst, CGCZrMe$_2$, 10 μmol; cocatalyst, $B_{1,n\text{-}octyl}$, 10 μmol; ethylene, 1 atm; rxn temp., temperature of bath surrounding reactor; MeCy, 50 mL;

[b]Kg · (mol of metal)$^{-1}$ · h$^{-1}$ · atm$^{-1}$.

[c]Yield of volatile $C6^=$ to $C14^=$ oligomers. Oligomer qualitative and quantitative analysis by GC-MS using n-heptane as internal standard. Includes hexenes ($C6^=$), octenes ($C8^=$), decenes ($C10^=$), dodecenes ($C12^=$) and tetradecenes ($C14^=$).

[d]wt. % of each oligomer class, analyzed by GC-MS.

[e]isomeric decenes, dodecenes, and tetradecenes were analyzed respectively.

As for the fraction of added 1-hexene consumed in entry 13 of Table 1, GC-MS analysis was performed immediately after quenching the reaction mixture with a small amount of methanol (MeOH). For an internal standard, n-heptane was used for quantification. The results indicate that most of the 1-hexene was consumed in the catalytic process (97% conversion). Entry 12 demonstrates the catalytic tunability of the HBPE product microstructure by introducing a comonomer.

Solvent effects (MeCy vs. toluene) on catalytic activity and branch formation selectivity were analyzed at similar conversion levels to minimize the influence of comonomer concentration changes over the course of these polymerizations.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for olefin oligomerization, the method comprising combining olefin monomers with a single-site organozirconium complex and a perfluoroarylborate compound in a non-polar non-coordinating solvent or a halogenated solvent, whereby the single-site organozirconium complex and the perfluoroarylborate compound mediate the oligomerization of the olefin monomers into an olefin oligomer comprising branches having end groups comprising vinyl groups, vinylidene groups, or a combination thereof, and reacting the end groups with one or more reactants to form functionalized end groups.

2. A method for olefin oligomerization, the method comprising combining α-olefin monomers with a single-site organozirconium complex and a perfluoroarylborate compound in a non-polar non-coordinating solvent or a halogenated solvent, whereby the single-site organozirconium complex and the perfluoroarylborate compound mediate the oligomerization of the olefin monomers into an olefin oligomer, wherein the α-olefin monomers comprise 1-hexene monomers.

3. A method for olefin oligomerization, the method comprising combining olefin monomers with a single-site organozirconium complex and a perfluoroarylborate compound in a non-polar non-coordinating solvent or a halogenated solvent, whereby the single-site organozirconium complex and the perfluoroarylborate compound mediate the oligomerization of the olefin monomers into an olefin oligomer, wherein the perfluoroarylborate compound has the structure:

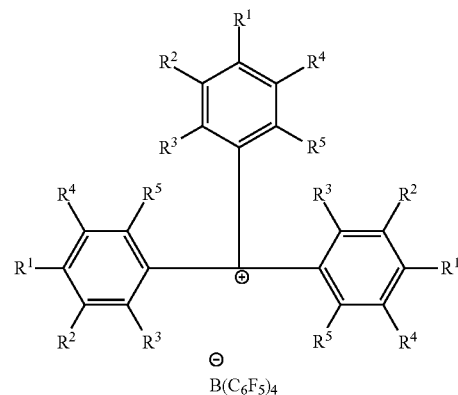

where:
each $R^1$, $R^2$, $R^3$, $R^4$, and $R^5$ is independently chosen from H, F, Cl, substituted or unsubstituted ($C_4$-$C_{40}$) alkyl, substituted or unsubstituted ($C_4$-$C_{40}$)alkenyl, and substituted or unsubstituted ($C_4$-$C_{40}$)cycloalkyl, wherein the substituted ($C_4$-$C_{40}$)alkyl and substituted ($C_4$-$C_{40}$)cycloalkyl are substituted with one or more $R^S$, where each $R^S$ is chosen from ($C_1$-$C_{20}$)alkyl and halogen;
provided that at least one of $R^1$, $R^2$, $R^3$, $R^4$, or $R^5$ is chosen from substituted or unsubstituted ($C_4$-$C_{30}$)alkyl and substituted or unsubstituted ($C_4$-$C_{40}$)cycloalkyl.

4. The method of claim 3, wherein the olefin monomers are combined with the single-site organozirconium complex and the perfluoroarylborate compound in the non-polar non-coordinating solvent.

5. The method of claim 4, wherein the non-polar non-coordinating solvent is methylcyclohexane.

6. The method of claim 4, wherein the non-polar non-coordinating solvent is pentane, hexane, heptane, octane, or cyclohexane.

7. The method of claim 3, wherein the olefin monomers include ethylene.

8. The method of claim 3, wherein the olefin monomers comprise α-olefin monomers.

9. The method of claim 3, wherein each $R^1$ is a substituted or unsubstituted ($C_4$-$C_{40}$)cycloalkyl.

10. The method of claim 9, wherein each $R^2$, $R^3$, $R^4$, and $R^5$ is an H atom.

11. The method of claim 9, wherein each $R^1$ is an unsubstituted ($C_4$-$C_{40}$)cycloalkyl.

12. The method of claim 11, wherein each $R^2$, $R^3$, $R^4$, and $R^5$ is an H atom.

13. The method of claim 3, wherein the perfluoroarylborate compound has the structure:

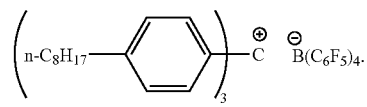

* * * * *